United States Patent
Kim et al.

(10) Patent No.: US 12,512,516 B2
(45) Date of Patent: Dec. 30, 2025

(54) 1,4-DIOXANE SLOVATE OF LITHIUM DIFLUOROBIS(OXALATO)PHOSPHATE, METHOD FOR PREPARING THE SAME, AND ELECTROLYTE COMPOSITION COMPRISING THE SAME

(71) Applicant: CHEMTROS CO., LTD., Ansan-si (KR)

(72) Inventors: Yong Il Kim, Incheon (KR); Jong Cheon Kim, Goyang-si (KR); Je Hyeon Yoo, Hwaseong-si (KR); Yoo Jin Jeon, Gunpo-si (KR); Donghoon Lee, Seoul (KR)

(73) Assignee: CHEMTROS CO., LTD., Ansan-si (KR)

( * ) Notice: Subject to any disclaimer, the term of this patent is extended or adjusted under 35 U.S.C. 154(b) by 614 days.

(21) Appl. No.: 17/919,085

(22) PCT Filed: Apr. 15, 2021

(86) PCT No.: PCT/KR2021/004768
§ 371 (c)(1),
(2) Date: Oct. 14, 2022

(87) PCT Pub. No.: WO2021/210934
PCT Pub. Date: Oct. 21, 2021

(65) Prior Publication Data
US 2023/0187700 A1 Jun. 15, 2023

(30) Foreign Application Priority Data
Apr. 16, 2020 (KR) ........................ 10-2020-0046003

(51) Int. Cl.
*H01M 10/0569* (2010.01)
*C07F 9/02* (2006.01)
(Continued)

(52) U.S. Cl.
CPC ......... *H01M 10/0569* (2013.01); *C07F 9/025* (2013.01); *C07F 9/146* (2013.01);
(Continued)

(58) Field of Classification Search
CPC ...... C07F 9/025; C07F 9/146; C07B 2200/13; H01M 10/052; H01M 10/0525;
(Continued)

(56) References Cited

U.S. PATENT DOCUMENTS 6,783,896 B2    8/2004  Tsujioka et al.
2011/0183219 A1* 7/2011  Mitsui .................... C01D 15/00
                                                 429/200

FOREIGN PATENT DOCUMENTS

CN    108910919 A  * 11/2018  ............ C01D 15/00
KR    10-1223084 B1    1/2013
(Continued)

OTHER PUBLICATIONS

Machine translation of CN-108910919, 2018.*
CN108910919 machine translation.*

*Primary Examiner* — Aiqun Li
(74) *Attorney, Agent, or Firm* — Sughrue Mion, PLLC

(57) ABSTRACT

A 1,4-dioxane solvate of lithium difluoro bis(oxalato)phosphate, a method for preparing the same, and an electrolyte composition containing the same are disclosed. The 1,4-dioxane solvate of lithium difluorobis(oxalato)phosphate has excellent crystallinity and filterability, so that a compound with high purity can be obtained in high yield. Further, since it has excellent stability against moisture, its distribution and storage are easy and the stability of the composition containing 1,4-dioxane solvate of lithium difluoro bis(oxalato)phosphate can be greatly improved.

13 Claims, 7 Drawing Sheets

(51) Int. Cl.
  *C07F 9/146* (2006.01)
  *H01M 10/0568* (2010.01)
(52) U.S. Cl.
  CPC ..... *H01M 10/0568* (2013.01); *C07B 2200/13* (2013.01); *H01M 2300/0028* (2013.01)
(58) Field of Classification Search
  CPC ........... H01M 10/056; H01M 10/0562; H01M 2300/0017; H01M 2300/0028; H01M 2300/0065; H01M 2300/0068
  See application file for complete search history.

(56) References Cited

FOREIGN PATENT DOCUMENTS

| | | |
|---|---|---|
| KR | 10-1395663 B1 | 5/2014 |
| KR | 10-2016-0024413 A | 3/2016 |
| KR | 10-1684377 B1 | 12/2016 |
| KR | 10-2019-0025006 A | 3/2019 |
| KR | 10-2019-0025693 A | 3/2019 |
| KR | 10-2209974 B1 | 2/2021 |
| WO | 00/06538 A1 | 2/2000 |
| WO | 2009/066559 A1 | 5/2009 |
| WO | 2016/002772 A1 | 1/2016 |

\* cited by examiner

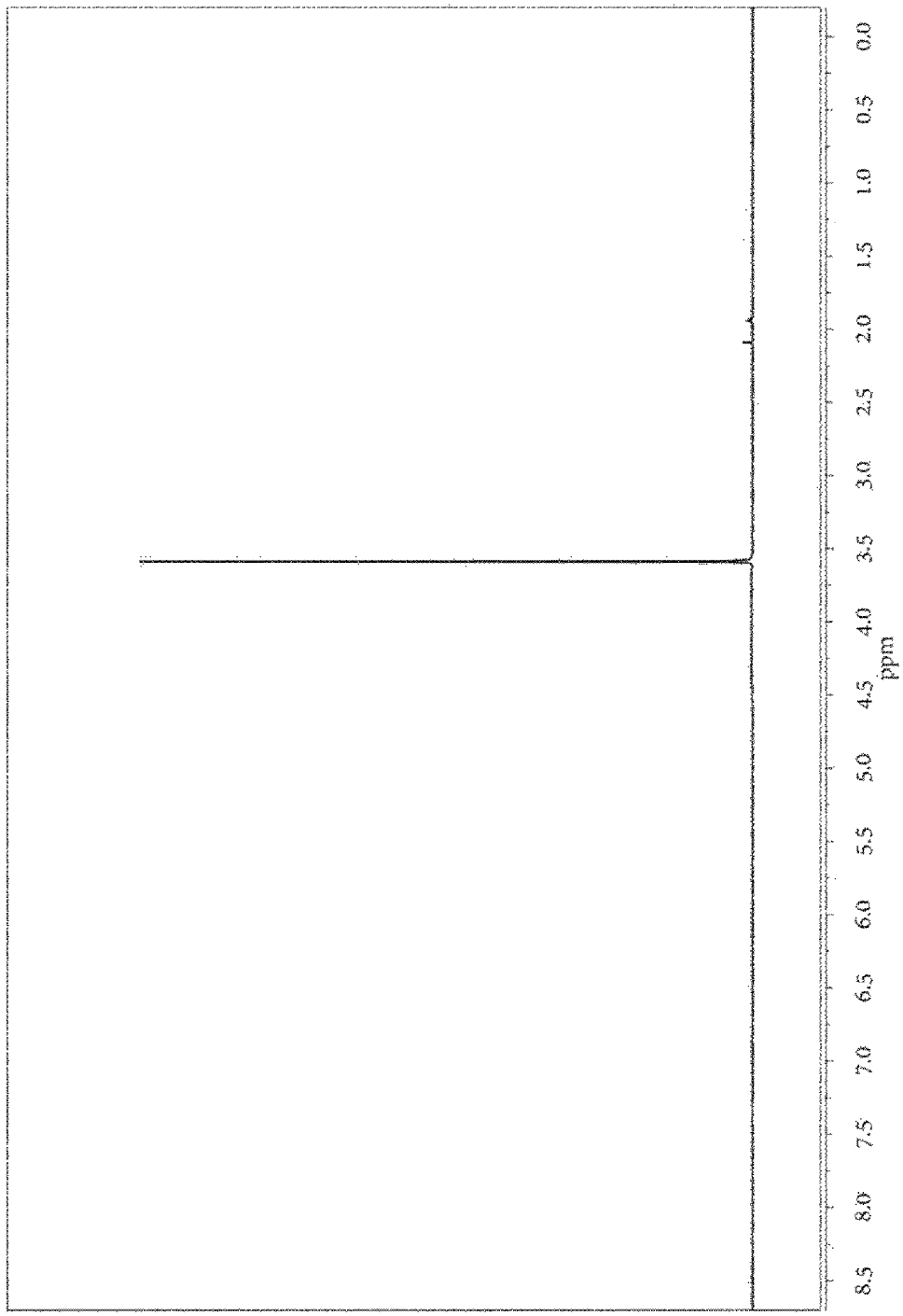
[FIG. 1]

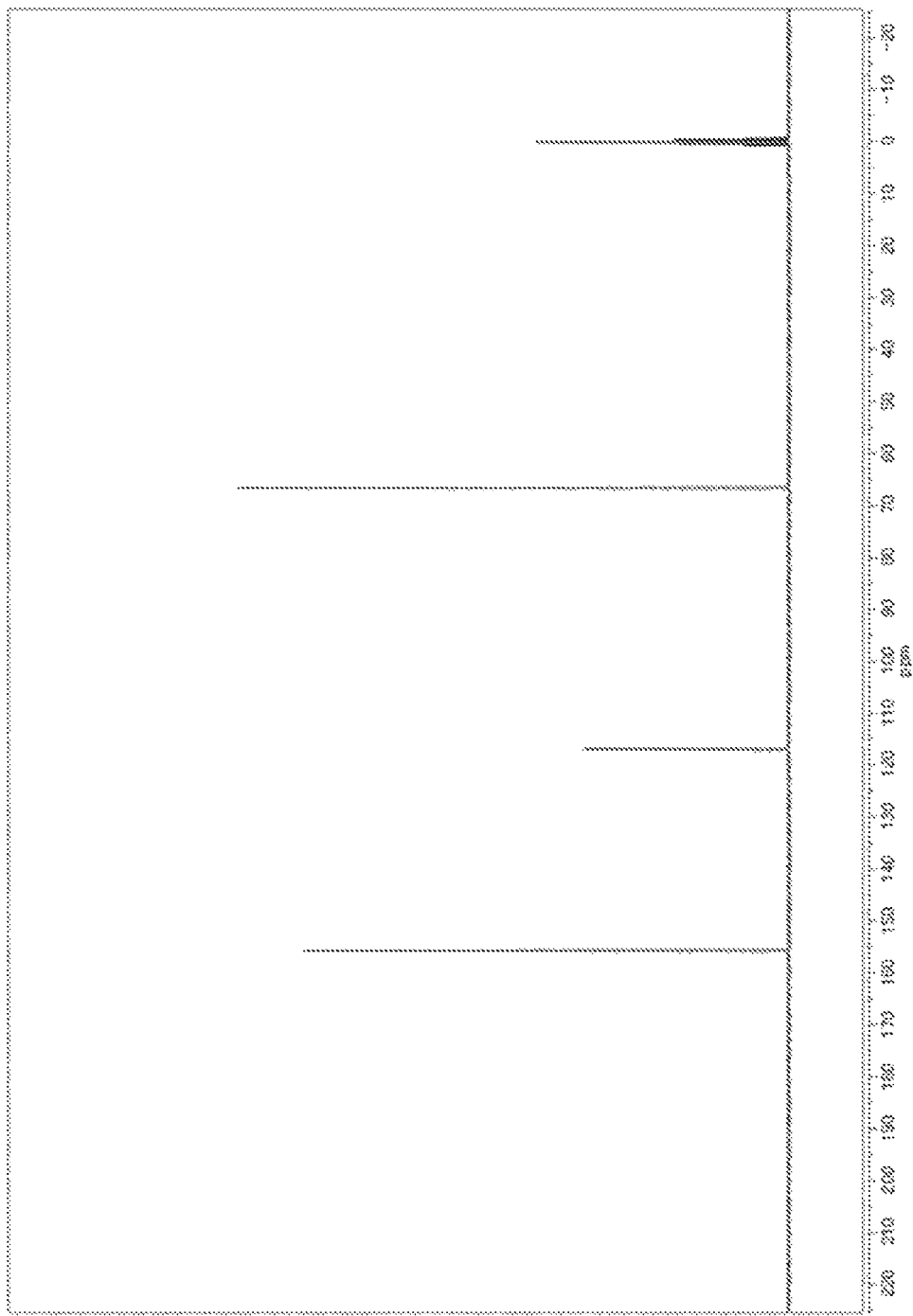
[FIG. 2]

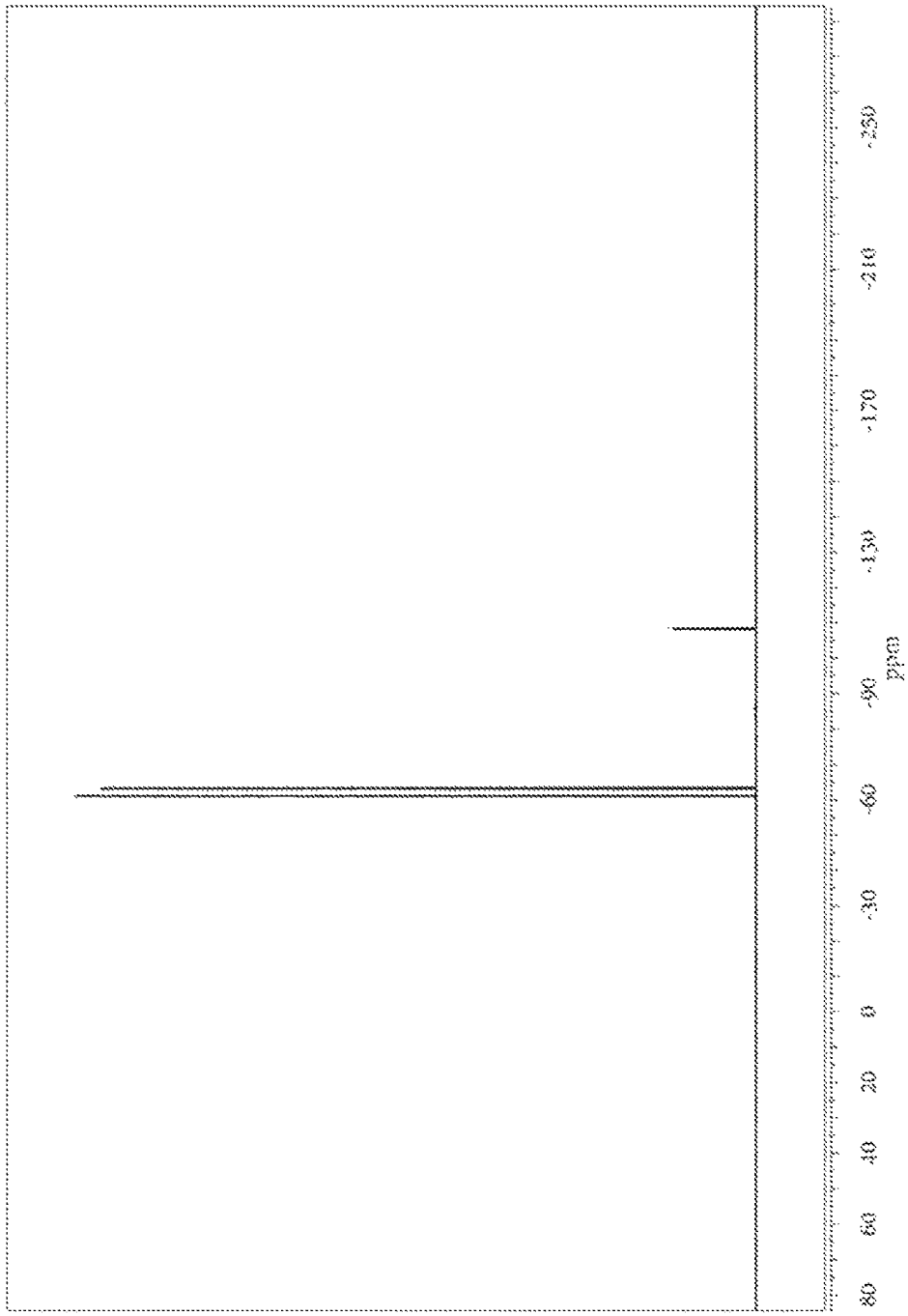
[FIG. 3]

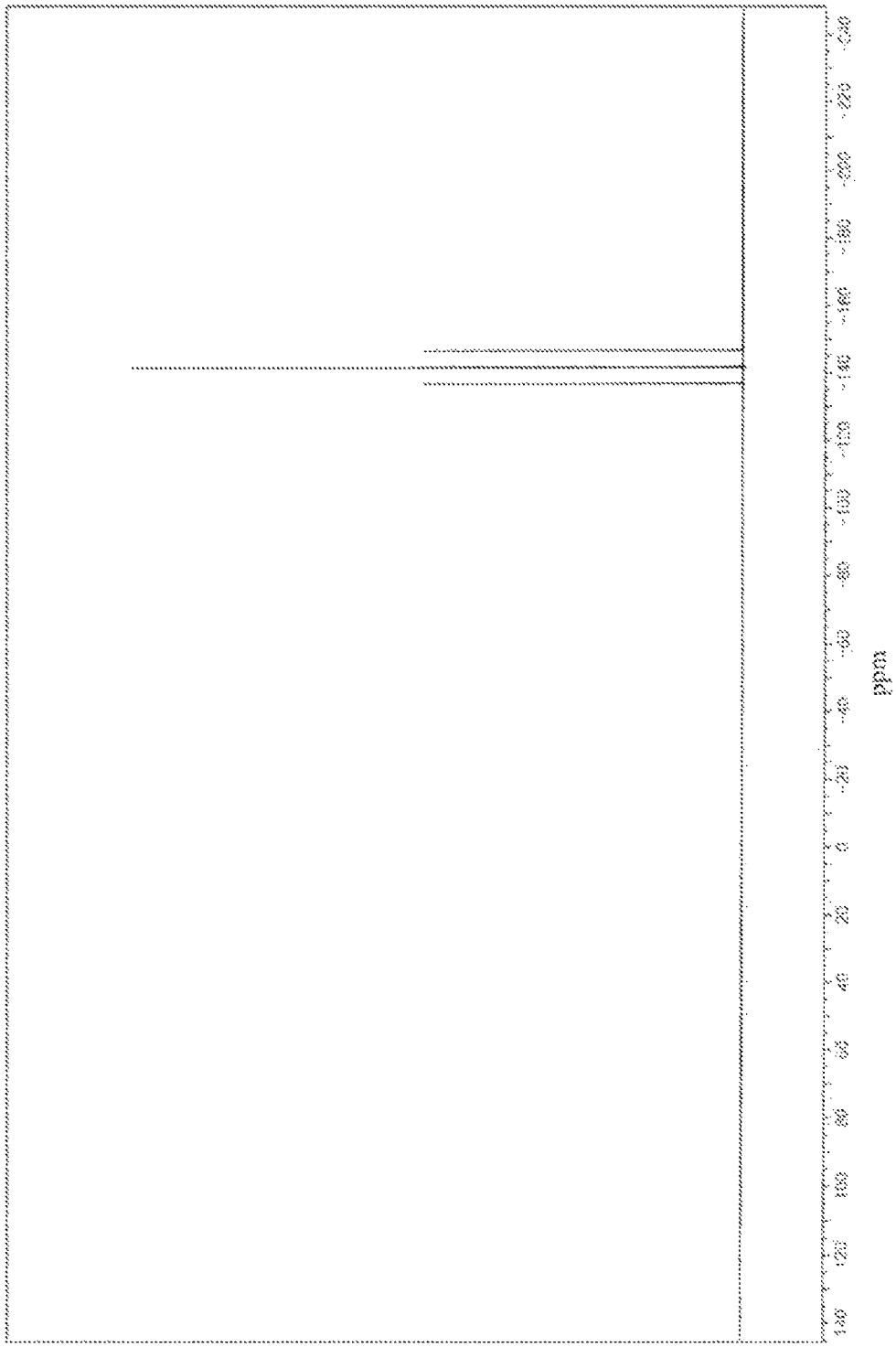
[FIG. 4]

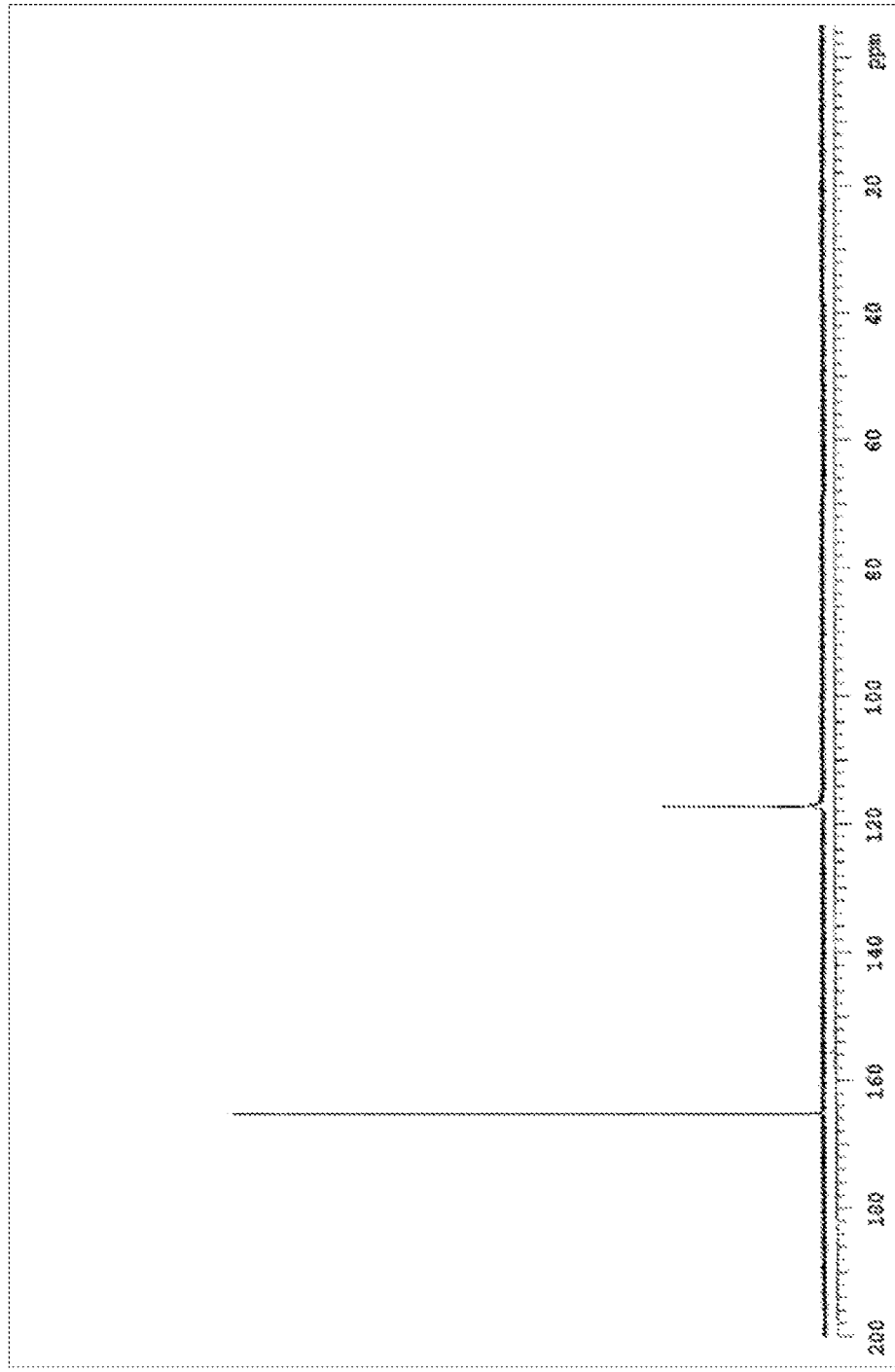
[FIG. 5]

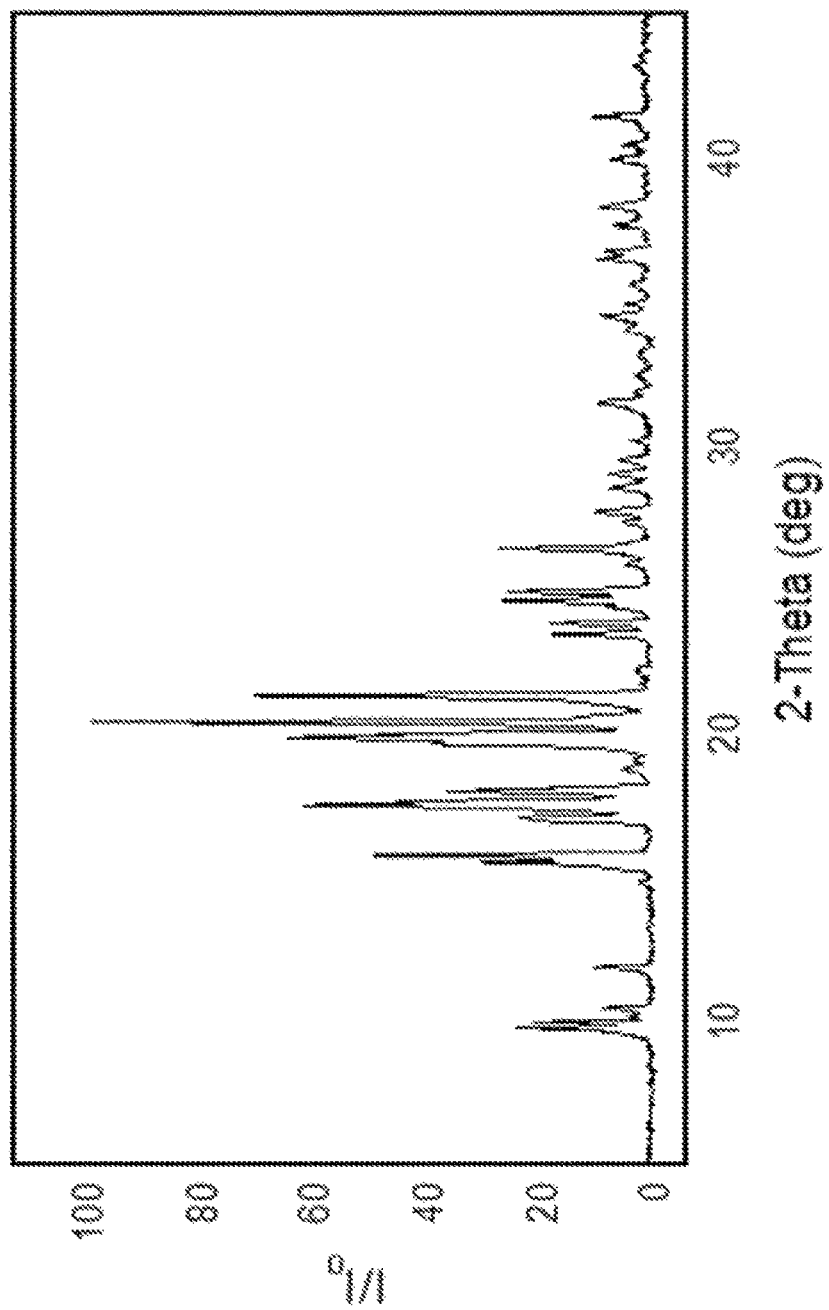
[FIG. 6]

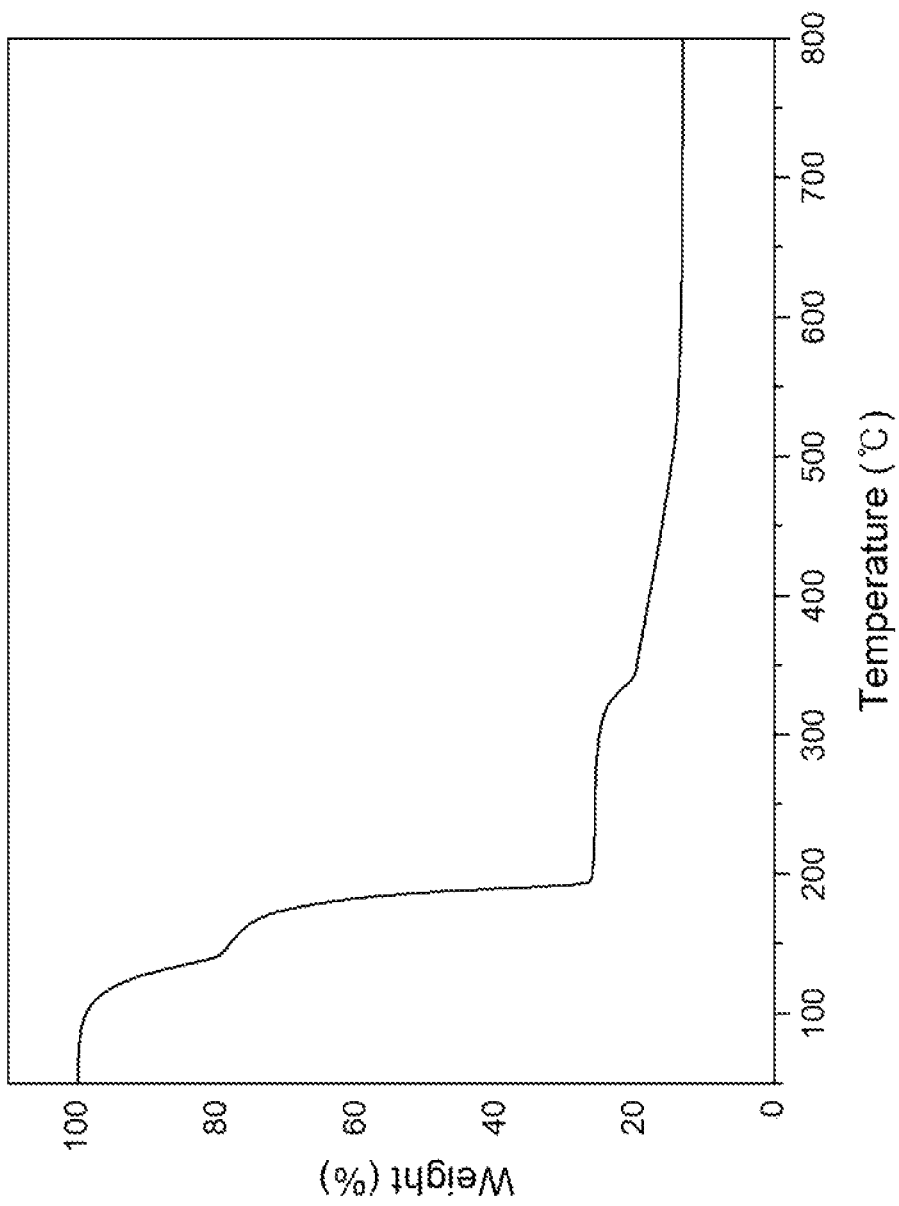
[FIG. 7]

1,4-DIOXANE SLOVATE OF LITHIUM DIFLUOROBIS(OXALATO)PHOSPHATE, METHOD FOR PREPARING THE SAME, AND ELECTROLYTE COMPOSITION COMPRISING THE SAME

This application is a National Stage of International Application No. PCT/KR2021/004768 filed Apr. 15, 2021, claiming priority based on Korean Patent Application No. 10-2020-0046003 filed Apr. 16, 2020.

TECHNICAL FIELD

The present invention relates to a 1,4-dioxane solvate of lithium difluorobis(oxalato)phosphate, a method for preparing the same, and an electrolyte composition comprising the same. More particularly, the present invention relates to a 1,4-dioxane solvate of lithium difluorobis(oxalato)phosphate having excellent stability against moisture, a method for preparing the same, and an electrolyte composition comprising the same.

BACKGROUND ART

Lithium difluorobis(oxalato)phosphate (LDFOP) represented by the following formula (I) is used as a non-aqueous electrolyte additive for improving the performance of lithium secondary batteries, lithium ion capacitors, etc. [see U.S. Pat. No. 6,783,896, International Patent Publication No. WO 2009/066559].

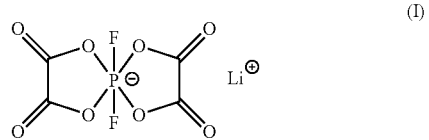 [SMILES: O=C1O[P-]2(F)(F)(OC1=O)OC(=O)C(=O)O2 ; [Li+]]

(I)

The LDFOP is usually prepared in a solution form. For example, Korean Patent No. 10-1223084 discloses a method for preparing LDFOP solution comprising mixing lithium hexafluorophosphate and oxalic acid in a non-aqueous solvent, and adding silicon tetrachloride thereto to react.

The LDFOP solution prepared by the above method contains $LiPF_6$ as a raw material and LDFOP as a product, and they have a property of being decomposed by moisture, thereby generating various by-products such as free acids and chlorides. Since free acids and chlorides adversely affect the properties of the batteries, it is necessary to devise means for suppressing by-products by carefully controlling the equivalent of the reactants or the reaction temperature. However, in the case of mass production, the control of reaction temperature or equivalent may cause a decrease in yield or generation of unreacted substances.

Accordingly, various attempts have been made to separate and purify LDFOP present in the LDFOP solution prepared as described above to be a pure solid form without by-products. For example, a method of generating a solid using a combination of a solvent having good solubility for LDFOP and a solvent having low solubility and separating a solid/liquid has been proposed. However, LDFOP in a solid form separated by this method is difficult to purify due to poor crystallinity and filterability, and has a property of easily absorbing moisture even after drying, making it difficult to manufacture, store and handle.

In addition, LDFOP has a problem of increased cost when stored and distributed in a solution state because its solubility in carbonate-based solvents typically used in electrolytes is lower than 30% (w/v).

Accordingly, there is an urgent need to develop a method capable of obtaining LDFOP in a solid form that is easy to purify and increasing its stability against moisture.

DISCLOSURE

Technical Problem

As a result of intensive research to solve the problems of the prior art, the present inventors found that 1,4-dioxane can form a solvate in a stable complex form through coordinate bond with lithium difluorobis(oxalato)phosphate, and completed the present invention.

Accordingly, an object of the present invention is to provide a 1,4-dioxane solvate of lithium difluorobis(oxalato)phosphate in a solid form with excellent stability against moisture and high purity.

Another object of the present invention is to provide a method for preparing the 1,4-dioxane solvate of lithium difluorobis(oxalato)phosphate.

Another object of the present invention is to provide an electrolyte composition for a secondary battery comprising the 1,4-dioxane solvate of lithium difluorobis(oxalato)phosphate.

Technical Solution

One embodiment of the present invention relates to a 1,4-dioxane solvate of lithium difluorobis(oxalato)phosphate.

The lithium difluorobis(oxalato)phosphate (LDFOP) may be a compound represented by the following formula (I):

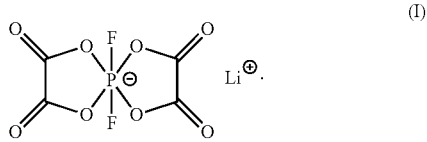 [SMILES: O=C1O[P-]2(F)(F)(OC1=O)OC(=O)C(=O)O2 ; [Li+]]

(I)

The 1,4-dioxane solvate of lithium difluorobis(oxalato) phosphate according to an embodiment of the present invention may be a crystalline form.

The crystalline form is characterized by characteristic 2theta (2θ) diffraction angle peaks and relative peak intensity at each diffraction angle in an X-ray powder diffraction spectrum irradiated with a Cu-Kα light source.

In particular, the 1,4-dioxane solvate of lithium difluorobis(oxalato)phosphate according to an embodiment of the present invention is a crystalline compound showing an X-ray powder diffraction (XRPD) pattern characterized by peaks having $I/I_o$ values of at least 10% (I is the intensity of each peak; $I_o$ is the intensity of the highest peak) at diffraction angles (2θ) of 9.7±0.2, 9.9±0.2, 15.4±0.2, 15.7±0.2, 16.9±0.2, 17.5±0.2, 17.9±0.2, 19.6±0.2, 19.8±0.2, 20.3±0.2, 21.3±0.2, 23.4±0.2, 23.8±0.2, 24.6±0.2, 24.9±0.2, 26.4±0.2 and 41.4±0.2.

The 1,4-dioxane solvate of lithium difluorobis(oxalato) phosphate according to an embodiment of the present invention has excellent crystallinity and filterability and thus is easy to purify. Therefore, it is possible to prepare the compound with purity of 99.5% or more in high yield.

In addition, since the 1,4-dioxane solvate of lithium difluorobis(oxalato)phosphate according to an embodiment of the present invention has excellent stability against moisture, the stability of the composition comprising the same can be greatly improved. Further, it is easy to distribute and store, and the preparing process is convenient and safe.

One embodiment of the present invention relates to a method for preparing a 1,4-dioxane solvate of lithium difluorobis(oxalato)phosphate comprising:

(i) adding 1,4-dioxane to a solution of lithium difluorobis(oxalato)phosphate dissolved in a non-aqueous solvent, followed by stirring; and (ii) filtering a solid produced in step (i).

In one embodiment of the present invention, the lithium difluorobis(oxalato)phosphate (LDFOP) can be prepared by adding methyltrichlorosilane ($MeSiCl_3$) or silicon tetrachloride ($SiCl_4$) to lithium hexafluorophosphate ($LiPF_6$) and oxalic acid to react.

In particular, when methyltrichlorosilane ($MeSiCl_3$) is used, a 1,4-dioxane solvate of lithium difluorobis(oxalato)phosphate with high purity can be efficiently and industrially prepared.

When methyltrichlorosilane ($MeSiCl_3$) is used, the molar ratio of lithium hexafluorophosphate and oxalic acid may be 1:1.8 to 1:2.2, preferably 1:1.95 to 1:2.1. When the molar ratio of lithium hexafluorophosphate and oxalic acid satisfies the above range, the yield and chemical selectivity of LDFOP are excellent.

In addition, when methyltrichlorosilane ($MeSiCl_3$) is used, the molar ratio of lithium hexafluorophosphate and methyltrichlorosilane ($MeSiCl_3$) may be 1:1.2 to 1:2.5, preferably 1:1.8 to 1:2.0. When the molar ratio of lithium hexafluorophosphate and methyltrichlorosilane satisfies the above range, the yield and chemical selectivity of LDFOP are excellent.

When silicon tetrachloride ($SiCl_4$) is used, the molar ratio of lithium hexafluorophosphate and oxalic acid may be 1:1.9 to 1:2.1, and the molar ratio of silicon tetrachloride and lithium hexafluorophosphate may be 1:0.95 to 1:1.1.

The reaction temperature may preferably be in the range of 20 to 70° C. If the temperature is out of the above range, the yield and/or chemical selectivity of LDFOP may be deteriorated. Preferably, the LDFOP may be prepared with high chemical selectivity by reacting in the range of 20 to 45° C. and then reacting in the range of 30 to 70° C. by raising the temperature.

The oxalic acid may be the one obtained by drying a commercially available oxalic acid dihydrate, and the drying method is not particularly limited, but a method such as heating or vacuum drying may be used.

The reaction may be carried out in a non-aqueous solvent. The non-aqueous solvent may be one or more solvents selected from the group consisting of cyclic carbonates, chain carbonates, chain nitriles, cyclic esters, chain esters, and chain halogenated solvents. For example, cyclic carbonates such as propylene carbonate, ethylene carbonate, butylene carbonate, and the like, chain carbonates such as diethyl carbonate, dimethyl carbonate, ethyl methyl carbonate, and the like, chain nitriles such as acetonitrile, propionitrile, and the like, cyclic esters such as butyrolactone, valerolactone, and the like, chain esters such as ethyl acetate and ethyl propionate, and the like, and chain halogenated solvents such as dichloromethane, 1,2-dichloroethane, and the like may be used, but the solvent is not limited thereto.

These non-aqueous solvents are preferably dehydrated one, and the water concentration in the non-aqueous solvent used in the present invention is preferably 100 ppm by weight or less. The water concentration higher than 100 ppm by weight is not preferable because $LiPF_6$ and LDFOP are hydrolyzed.

In step (i), the concentration of the lithium difluorobis(oxalato)phosphate solution may be 5 to 50% (w/v), preferably 15 to 40% (w/v).

In step (i), the addition amount of 1,4-dioxane to the lithium difluoro bis(oxalato)phosphate solution may be 1:0.5 to 1:8.0 by weight, preferably 1:1.0 to 1:3.0. When 1,4-dioxane is used in the above range, a 1,4-dioxane solvate of lithium difluorobis(oxalato)phosphate in a crystalline form can be obtained in high yield.

In addition, the stirring may be performed at 0 to 60° C., preferably 15 to 35° C. In addition, the stirring may be performed for 1 to 30 hours, preferably 3 to 10 hours. A 1,4-dioxane solvate of lithium difluorobis(oxalato)phosphate in a crystalline form can be obtained in high yield using the above stirring temperature and stirring time ranges.

In step (ii), drying may be performed after filtration. The drying may be performed under vacuum at 20 to 60° C.

According to the preparing method of the present invention, 1,4-dioxane solvate of lithium difluorobis(oxalato)phosphate in a crystalline form can be efficiently prepared.

One embodiment of the present invention relates to an electrolyte composition for a secondary battery comprising a 1,4-dioxane solvate of lithium difluorobis(oxalato)phosphate, a non-aqueous solvent, and a lithium salt.

The non-aqueous solvent may be those mentioned in the description of the 1,4-dioxane solvate of lithium difluorobis(oxalato)phosphate.

$LiPF_6$, $LiBF_4$, $LiClO_4$, $LiAsF_6$, $LiSbF_6$, $LiCF_3SO_3$, $LiN(SO_2CF_3)_2$, $LiN(SO_2C_2F_5)_2$, LiFSI, $LiN(SO_2CF_3)(SO_2C_4F_9)$, $LiC(SO_2CF_3)_3$, $LiPF_3(C_3F_7)_3$, $LiB(CF_3)_4$, $LiBF_3(C_2F_5)$, $LiB(C_2O_4)_2$, and the like may be used as the lithium salt, and these can be used alone or in combination.

Further, the electrolyte composition according to an embodiment of the present invention may further comprise compounds having an overcharge prevention effect, an anode film formation effect, and a cathode protective effect as other additives. The examples of such compounds include lithium difluoro(oxalato)borate, cyclohexyl benzene, t-butyl benzene, vinylene carbonate, vinylethylene carbonate, difluoroanisole, fluoroethylene carbonate, propane sultone, dimethylvinylene carbonate, and the like.

The method for preparing the electrolyte composition according to an embodiment of the present invention is not particularly limited. For example, the 1,4-dioxane solvate of lithium difluorobis(oxalato)phosphate is added to the non-aqueous solvent to a predetermined concentration along with lithium salt and other additives and mixed to obtain a desired electrolyte composition.

The secondary battery may be a lithium secondary battery, for example, a lithium ion secondary battery.

Advantageous Effects

The 1,4-dioxane solvate of lithium difluorobis(oxalato)phosphate according to the present invention has excellent crystallinity and filterability, so that a compound with high purity of 99.5% or more can be obtained in high yield. Further, since it has excellent stability against moisture, its distribution and storage are easy and the stability of the composition comprising the same can be greatly improved. In addition, the 1,4-dioxane solvate of lithium difluorobis (oxalato)phosphate according to the present invention can be industrially mass-produced by a simple process.

BRIEF DESCRIPTION OF FIGURES

FIG. 1 is a result of $^1$H NMR analysis of the 1,4-dioxane solvate of lithium difluorobis(oxalato)phosphate.

FIG. 2 is a result of $^{13}$C NMR analysis of the 1,4-dioxane solvate of lithium difluorobis(oxalato)phosphate.

FIG. 3 is a result of $^{19}$F NMR analysis of the 1,4-dioxane solvate of lithium difluorobis(oxalato)phosphate.

FIG. 4 is a result of $^{31}$P NMR analysis of the 1,4-dioxane solvate of lithium difluorobis(oxalato)phosphate.

FIG. 5 is a result of $^{13}$C NMR analysis of the lithium difluorobis(oxalato)phosphate.

FIG. 6 is an X-ray powder diffraction pattern of the 1,4-dioxane solvate of lithium difluorobis(oxalato)phosphate in a crystalline form.

FIG. 7 is a thermogravimetric analysis diagram of the 1,4-dioxane solvate of lithium difluorobis(oxalato)phosphate.

BEST MODE

The present invention is further illustrated by the following examples, which are not to be construed to limit the scope of the invention.

Example 1: Preparation of 1,4-dioxane Solvate of Lithium difluorobis(oxalato)phosphate 26 g of lithium hexafluorophosphate (LiPF$_6$) (0.171 mol), 30.8 g of anhydrous oxalic acid, and 174 g of ethyl methyl carbonate were added to a 500 ml three-neck double jacketed reactor with a magnetic stirrer, mixed and stirred. The molar ratio of lithium hexafluorophosphate and oxalic acid was 1:2. The reaction temperature was set to 40° C. to raise the internal temperature, and then 51.2 g of methyltrichlorosilane (MeSiCl$_3$) was added dropwise over 1 hour. The molar ratio of lithium hexafluorophosphate and methyltrichlorosilane was 1:2. After completion of the addition, stirring was continued at 40° C. for an additional 2 hours to complete the reaction. After completion of the reaction, a transparent, colorless filtrate was obtained.

MeSiF$_3$ and HCl gas, which were reaction by-products, were collected by first passing 500 g of water cooled to 10° C. or less, and then passing through a −50° C. low temperature trap.

After HCl gas and volatile materials were removed by degassing with a vacuum pump at room temperature for 2 hours, 322 g of 1,4-dioxane was added and stirred at room temperature for 10 hours. The resulting solid was filtered and dried under vacuum at 50° C. to obtain 73.1 g of the title compound as a white solid (yield: 100%).

As an internal standard, 3,5-difluorobenzonitrile was added and dissolved in acetonitrile-d$_3$ to measure $^1$H, $^{13}$C, $^{19}$F and $^{31}$P NMR. The results are shown in FIGS. 1 to 4.

The structure can be confirmed in $^{13}$C, $^{19}$F and $^{31}$P NMR of FIGS. 2, 3 and 4, and the molar ratio of 1,4-dioxane to LDFOP was calculated as 1:2.0 from the $^1$H and $^{19}$F NMR results of FIGS. 1 and 3.

The purity of the obtained solvate was measured with a nuclear magnetic resonance spectrometer (NMR spectrometer). As a result, it was confirmed that the purity was 99.5%.

Example 2: Preparation of 1,4-dioxane Solvate of Lithium difluorobis(oxalato)phosphate 72.4 g (yield 99%, purity: 99.5%) of the title compound was obtained in the same manner as in Example 1, except that dimethyl carbonate was used instead of ethyl methyl carbonate as a solvent.

Example 3: Preparation of 1,4-dioxane Solvate of Lithium difluorobis(oxalato)phosphate 72.3 g (yield 99%, purity: 99.5%) of the title compound was obtained in the same manner as in Example 1, except that diethyl carbonate was used instead of ethyl methyl carbonate as a solvent.

Comparative Example 1

The same method as in Example 1 was performed except that tetrahydrofuran was used instead of 1,4-dioxane, but no solid was produced.

Comparative Example 2

The same method as in Example 1 was performed except that 1,3-dioxane was used instead of 1,4-dioxane, but no solid was produced.

Comparative Example 3

The same method as in Example 1 was performed except that 2-methyl-1,3-dioxolane was used instead of 1,4-dioxane, but no solid was produced.

Comparative Example 4

The same method as in Example 1 was performed except that 4-methyl-1,3-dioxolane was used instead of 1,4-dioxane, but no solid was produced.

Comparative Example 5

The same method as in Example 1 was performed except that tetrahydropyran was used instead of 1,4-dioxane, but no solid was produced.

Comparative Example 6

The same method as in Example 1 was performed except that 2-methyltetrahydrofuran was used instead of 1,4-dioxane, but no solid was produced.

Comparative Example 7

The same method as in Example 1 was performed except that 1,3,5-trioxane was used instead of 1,4-dioxane, but no solid was produced.

Comparative Example 8: Preparation of Lithium difluorobis(oxalato)phosphate in a Solid Form 26 g of lithium hexafluorophosphate (LiPF$_6$) (0.171 mol), 30.8 g of anhydrous oxalic acid, and 174 g of ethyl methyl carbonate were added to a 500 ml three-neck double jacketed reactor with a magnetic stirrer, mixed and stirred. The molar ratio of lithium hexafluorophosphate and oxalic acid was 1:2. The reaction temperature was set to 40° C. to raise the internal temperature, and then 51.2 g of methyltrichlorosilane (MeSiCl$_3$) was added dropwise over 1 hour. The molar ratio of lithium hexafluorophosphate and methyltrichlorosilane was 1:2. After completion of the addition, stirring was continued at 40° C. for an additional 2 hours to complete the reaction. After completion of the reaction, a transparent, colorless filtrate was obtained.

MeSiF$_3$ and HCl gas, which were reaction by-products, were collected by first passing 500 g of water cooled to 10° C. or less, and then passing through a −50° C. low temperature trap.

After HCl gas and volatile materials were removed by degassing with a vacuum pump at room temperature for 2 hours, 322 g of methylene chloride (MC) was added, stirred at room temperature for 10 hours, and filtered to obtain 27.5 g of the title compound as a white solid (yield: 64%).

Lithium difluorobis(oxalato)phosphate in a solid form was confirmed by $^{13}$C NMR (FIG. 5).

Experimental Example 1: XRD Analysis

X-ray powder diffraction analysis (XRD) of the 1,4-dioxane solvate of lithium difluorobis(oxalato)phosphate prepared in Example 1 was performed, and the results are shown in FIG. 6.

FIG. 6 showed that the compound prepared in Example 1 was a crystalline form. The characteristic peaks shown in the XRD of FIG. 6 are shown in Table 1 below, where '2θ' denotes a diffraction angle, and 'I/I$_0$' denotes the relative intensity of the peak.

TABLE 1

| 2θ | I/I$_0$ (%) |
|---|---|
| 9.7 | 21 |
| 9.9 | 19 |
| 15.4 | 27 |
| 15.7 | 43 |
| 16.9 | 21 |
| 17.5 | 49 |
| 17.9 | 29 |
| 19.6 | 35 |
| 19.8 | 53 |
| 20.3 | 100 |
| 21.3 | 66 |
| 23.4 | 15 |
| 23.8 | 17 |
| 24.6 | 25 |
| 24.9 | 23 |
| 26.4 | 26 |
| 41.4 | 10 |

Experimental Example 2: Thermogravimetric Analysis (TGA)

Thermogravimetric analysis (TGA) was performed on the 1,4-dioxane solvate of lithium difluorobis(oxalato)phosphate prepared in Example 1.

Thermogravimetric analysis (TGA) was performed using a STA 409 PC/PG from NETZSCH. About 20 mg of a sample was placed in a platinum pan to prepare a sample required for the TGA experiment. It was heated to 25-800° C. under nitrogen at a rate of 10° C./min. The results of thermogravimetric analysis are shown in FIG. 7.

Experimental Example 3: Hygroscopicity Test

The hygroscopicity of each of the compounds prepared in Example 1 and Comparative example 8 was evaluated by the Karl Fischer Titration method.

Specifically, the hygroscopicity was measured by exposing 100 g of the sample to constant moisture at room temperature, weighing 0.2 g of the sample, and titrating the change in moisture of the solid by a coulometric method. The results are shown in Table 2 below.

TABLE 2

| | Moisture gain (ppm) | | | | |
|---|---|---|---|---|---|
| | 0 day | 0.5 day | 1 day | 2 days | 7 days |
| Example 1 | 0 | 88 | 166 | 321 | 866 |
| Comparative example 8 | 0 | 893 | 1711 | 2343 | 4521 |

Table 2 shows that the hygroscopicity of the 1,4-dioxane solvate of lithium difluorobis(oxalato)phosphate prepared in Example 1 is lower than that of the lithium difluorobis (oxalato)phosphate in a solid form prepared in Comparative Example 8.

Experimental Example 4: Test of Impurity Content 3.1 g of the compound prepared in Example 1 was dissolved in 10 g of ethyl methyl carbonate to prepare a sample, and 2.0 g of the compound prepared in Comparative example 8 was dissolved in 10 g of ethyl methyl carbonate to prepare a sample. Then, the moisture content in each sample, acidity and chlorine (Cl) content were measured.

The results are shown in Table 3 below.

TABLE 3

| | Example 1 | Comparative example 8 |
|---|---|---|
| Moisture (ppm) | 10.2 | 23.1 |
| Acidity (ppm) | 24 | 46 |
| Cl content (ppm) | N/D | 688 |

Table 3 shows that the moisture content, acidity and chlorine (Cl) content of the 1,4-dioxane solvate of lithium difluorobis(oxalato)phosphate prepared in Example 1 are lower than those of the lithium difluorobis(oxalato)phosphate in a solid form prepared in Comparative example 8. In particular, it was confirmed that chlorine (Cl) was not detected in the 1,4-dioxane solvate of lithium difluorobis (oxalato)phosphate prepared in Example 1.

The invention claimed is:

1. A crystalline 1,4-dioxane solvate of lithium difluorobis (oxalato) phosphate, showing an X-ray powder diffraction (XRPD) pattern characterized by peaks having I/I$_o$ values of at least 10% (I is the intensity of each peak; I$_o$ is the intensity of the highest peak) at diffraction angles (2θ) of 9.7±0.2, 9.9±0.2, 15.4±0.2, 15.7±0.2, 16.9±0.2, 17.5±0.2, 17.9±0.2, 19.6±0.2, 19.8±0.2, 20.3±0.2, 21.3±0.2, 23.4±0.2, 23.8±0.2, 24.6=0.2, 24.9±0.2, 26.4±0.2, and 41.4±0.2.

2. The crystalline solvate according to claim 1, wherein the lithium difluorobis (oxalato) phosphate is represented by the following formula (I):

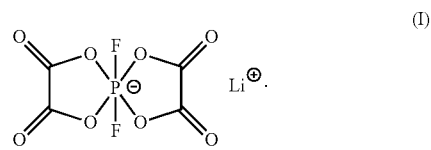 [SMILES: O=C1O[P-]2(F)(F)(OC1=O)OC(=O)C(=O)O2 ; [Li+]]

(I)

3. The crystalline solvate according to claim 1, wherein the crystalline solvate has a purity of 99.5% or more.

4. An electrolyte composition for a secondary battery comprising the crystalline 1,4-dioxane solvate of lithium difluorobis (oxalato) phosphate according to claim 1, a non-aqueous solvent, and a lithium salt.

5. An electrolyte composition for a secondary battery comprising the crystalline 1,4-dioxane solvate of lithium difluorobis (oxalato) phosphate according to claim 2, a non-aqueous solvent, and a lithium salt.

6. An electrolyte composition for a secondary battery comprising the crystalline 1,4-dioxane solvate of lithium difluorobis (oxalato) phosphate according to claim 3, a non-aqueous solvent, and a lithium salt.

7. A method for preparing a crystalline 1,4-dioxane solvate of lithium difluorobis (oxalato) phosphate comprising:
(i) adding 1,4-dioxane to a solution of lithium difluorobis (oxalato) phosphate dissolved in a non-aqueous solvent, followed by stirring; and
(ii) filtering a solid produced in step (i),
wherein the crystalline solvate shows an X-ray powder diffraction (XRPD) pattern characterized by peaks having $I/I_o$ values of at least 10% (I is the intensity of each peak; $I_o$ is the intensity of the highest peak) at diffraction angles (2θ) of 9.7±0.2, 9.9±0.2, 15.4±0.2, 15.7±0.2, 16.9±0.2, 17.5±0.2, 17.9±0.2, 19.6±0.2, 19.8±0.2, 20.3±0.2, 21.3±0.2, 23.4±0.2, 23.8±0.2, 24.6±0.2, 24.9±0.2, 26.4±0.2, and 41.4±0.2.

8. The method according to claim 7, wherein the lithium difluorobis (oxalato) phosphate is prepared by adding methyltrichlorosilane ($MeSiCl_3$) or silicon tetrachloride ($SiCl_4$) to lithium hexafluorophosphate ($LiPF_6$) and oxalic acid to react.

9. The method according to claim 7, wherein a concentration of the lithium difluorobis (oxalato) phosphate solution in step (i) is 5 to 50% (w/v).

10. The method according to claim 7, wherein an addition amount of 1,4-dioxane to the lithium difluorobis (oxalato) phosphate solution in step (i) is 1:0.5 to 1:8.0 by weight.

11. The method according to claim 7, wherein the stirring in step (i) is performed for 1 to 30 hours.

12. The method according to claim 7, wherein the stirring in step (i) is performed at 0 to 60° C.

13. The method according to claim 7, wherein a drying is performed after the filtering in step (ii).

* * * * *